Nov. 30, 1954 — W. G. SECK — 2,695,631
FLEXIBLE HOSE
Filed Feb. 6, 1953 — 2 Sheets-Sheet 1

INVENTOR.
Werner G. Seck
BY
ATTORNEY.

Nov. 30, 1954   W. G. SECK   2,695,631
FLEXIBLE HOSE

Filed Feb. 6, 1953

INVENTOR.
Werner G. Seck
BY
ATTORNEY.

United States Patent Office 2,695,631
Patented Nov. 30, 1954

2,695,631

FLEXIBLE HOSE

Werner G. Seck, Canton, Ohio, assignor to The Hoover Company, North Canton, Ohio, a corporation of Ohio Application February 6, 1953, Serial No. 335,474

12 Claims. (Cl. 138—56)

The present invention relates to flexible hose and more particularly to a flexible hose specially adapted for use with suction cleaners.

Broadly, according to the present invention, the hose is formed of an extruded spirally wound strip of an elastomeric thermo-plastic material having an interlocked spiral seam with a spirally wound reinforcing wire interlocked within the seam.

Further, according to the present invention the hose is formed of a single extruded strip of an elastomeric thermo-plastic, formed at one edge with an interlocking continuous reentrant groove which mates with a complementary interlocking protuberance which is interlocked with the reentrant groove. The protuberance is formed with a continuous channel for receiving a reenforcing wire, the wall of the strip being slit into the channel whereby the wire may be easily inserted into the channel.

The above described strip is spirally wound and the protuberance interlocked within the reentrant groove. The reinforcing wire may be inserted into the channel of the protuberance either before or after the protuberance is interlocked with the reentrant groove.

The strip, between the reentrant groove and the protuberance, is comparatively thin and outwardly bulged to give the finished hose flexibility. In the finished hose the wire serves to interlock the mating protuberance with the reentrant groove and also serves to reinforce the finished hose against collapse.

The finished hose of the present invention comprises a spirally wound strip of an extruded elastomeric thermoplastic interlocked at its mating edges by means of a spirally wound reinforcing wire embedded within the joint between the mating edges.

An important element of the present invention is the extruded strip, above described, which forms the main component of the finished hose.

The strip per se comprises an outwardly bulged central section which connects mating edge sections one having a reentrant groove and the other a protuberance adapted to be interlocked within the reentrant groove of the first edge section.

The method of making the flexible hose of the present invention is disclosed and claimed in my co-pending application Serial No. 335,475, filed concurrently herewith.

The hose of the present invention can be made in continuous lengths according to the process of my above identified application and thereafter be cut to the proper lengths for use with suction cleaners.

Other objects and advantages of the present invention will become apparent as the description proceeds when taken in connection with the accompanying drawings in which.

Figure 2:
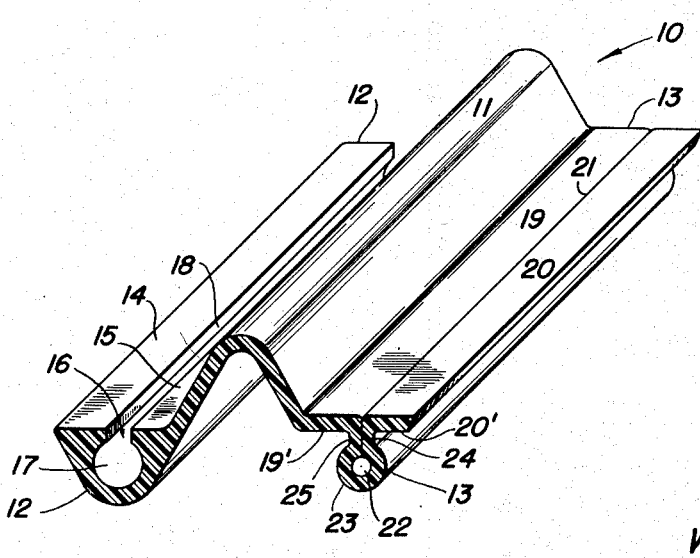
Figure 2 is a perspective view of the extruded strip which forms the main body of the flexible hose of the present invention.

Referring to the drawings, and particularly to Fig. 2 thereof, the extruded strip of elastomeric thermo-plastic material from which the main body of the flexible hose of the present invention is made is generally designated by the reference numeral 10.

The strip 10 comprises a centrally outwardly bulged section 11, joining edge sections 12 and 13.

The section 12 comprises upwardly facing lands 14 and 15 separated by a reentrant groove 16. As shown, the reentrant groove 16, is in the form of a continuous passage 17 and a narrower neck or slot 18 opening to the upper surface of edge 12 between the lands 14 and 15.

The edge 13 comprises lands 19 and 20 separated by a slit 21 which extends downwardly to a continuous channel 22 in interlocking protuberance 23. The outside diameter of protuberance 23 is substantially the same as the inside diameter of passage 17 and the thickness of the walls 24 and 25 is substantially the same as the width of the slot 18. On either side of the walls 24 and 25 are downwardly facing lands 19' and 20' adapted to mate with the lands 14 and 15 of the edge section 12 as the hose is formed.

Figure 1:
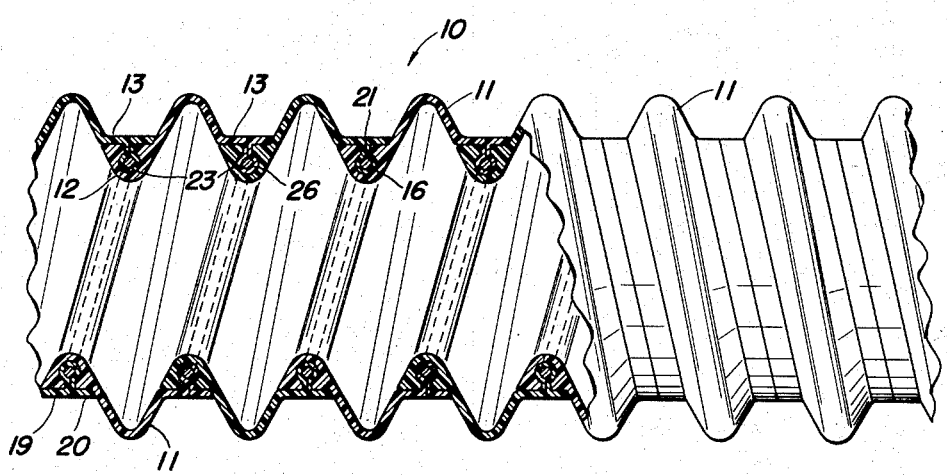
Figure 1 is a view of the finished hose of the present invention, partly in section and showing the construction thereof.

Referring to Fig. 1, the hose of the present invention comprises the spirally wound elastomeric thermo-plastic strip 10 having a relatively thin outwardly bulged portion or section 11 connecting the edge sections 12 and 13 and with the protuberance 23 interlocked within the reentrant groove 16 by means of a reinforcing wire 26.

It is to be understood that it is within the purview of the present invention that the protuberance 23 extend out laterally from the edge section 13 and that the reentrant groove 16 open laterally from section 12 and that the protuberance 23 be interlocked within the reentrant groove 16 laterally of the strip 10 rather than vertically as shown. It is preferable however, that those parts be interlocked as shown since the method of assembling is simpler in that case.

Figure 4:
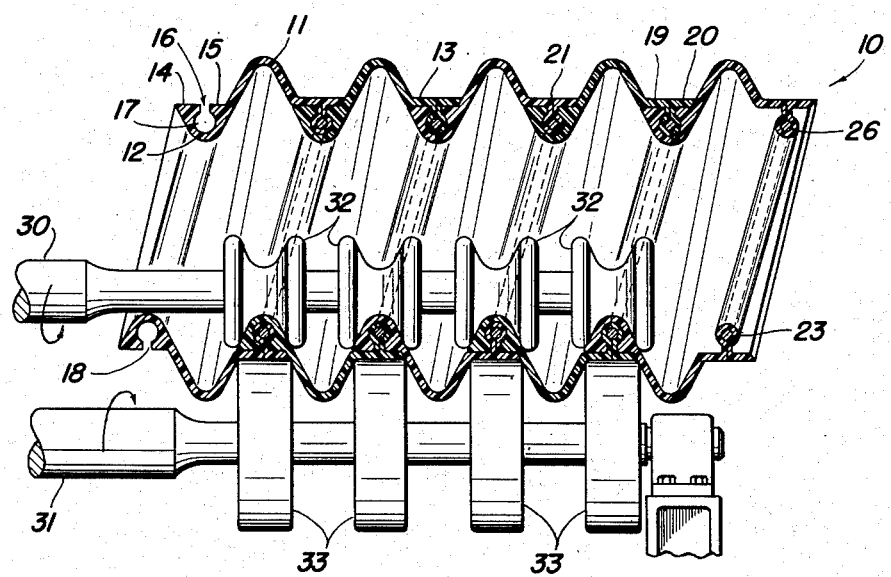
Figure 4 is another view of the mechanism of Fig. 3 showing the hose of the present invention in section as it is being formed.
Figure 3:
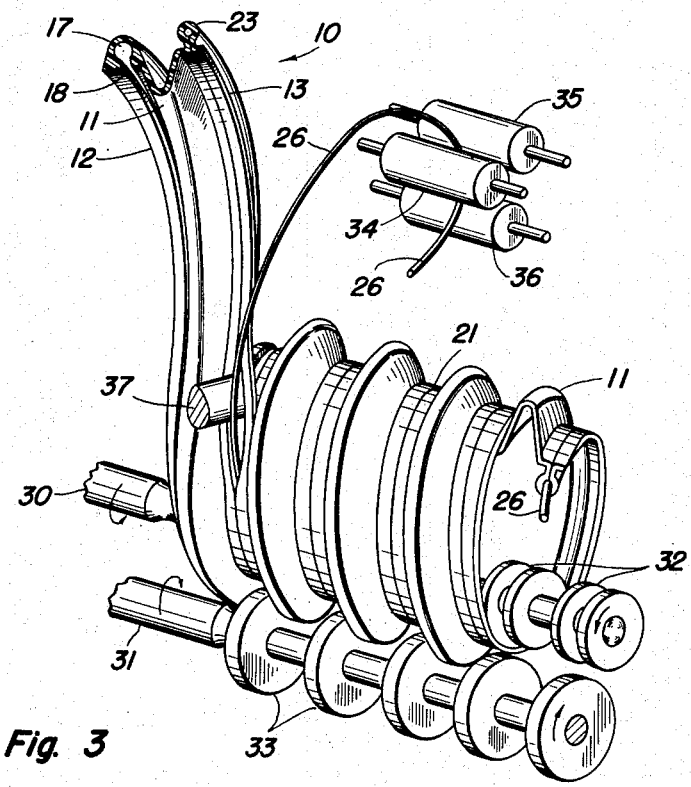
Figure 3 is a perspective view of a mechanism showing one way by which the hose of the present invention may be made.

One method of, and apparatus for, assembling the hose of the present invention is shown in Figs. 3 and 4 of the drawings.

Briefly the hose of the present invention is formed in the following manner.

The strip 10 is extruded from an elastomeric thermoplastic material in a manner well known in the art. The strip 10 may be fed directly from the extruder or from a reel and is spirally wound to mate the edge sections 12 and 13 with each other, the protuberance 23 of edge section 13 being interlocked with the reentrant groove 16 of the section 12, with the bulged section 11 extending outwardly and the lands 14 and 15 of edge section 12 mating with the lands 19' and 20' of edge section 13. As the strip 10 is spirally wound the slit 21 is opened and the spiral wire 26 inserted into the channel 22. The strip 10 being flexible the wire 26 may be inserted into the channel either before or after the edge sections 12 and 13 are interlocked with each other. If desired, the lands 14, 15, 19' and 20', the outer surface of protuberance 23, walls 24 and 25, the inner surface of duct 17 and groove 18 and the wire 26 may be coated with any suitable adhesive to assure that all parts will be firmly interlocked with each other.

By the apparatus shown in Figs. 3 and 4 the wire 26 is embedded into the channel 22 before the edge sections 12 and 13 are interlocked with each other. In my copending application, above referred to, a second apparatus is shown and described by which the wire 26 may be inserted into channel 22 after the edge sections 12 and 13 are interlocked with each other.

As shown in Figs. 3 and 4, one apparatus for assembling the hose of the present invention comprises counter rotating shafts 30 and 31 which rotate in the direction shown by their respective arrows. The shaft 30 carries a plurality of rollers 32 grooved to fit the contour of the inner side of edge section 12 of strip 10, while the shaft 31 carries flat surfaced rollers 33 for engagement with the lands 19 and 20 of edge section 13. The wire 26 is pre-stressed so as to form a spiral coil by rollers 34, 35 and 36. The shafts 30 and 31, and the rollers 34, 35 and 36 are preferably driven from a common source of power at the proper speeds depending upon the respective diameters of the rollers 32 and 33 and the rollers 34, 35 and 36.

The rollers 32 and 33 move the strip 10 from the extruding machine or from a reel while the rollers 34, 35 and 36 advance the wire 26 as it is prestressed to form a spiral coil. A plow 37 opens slit 21 as the strip 10 and wire 26 are advanced so that the wire 26 is fed into the channel 22 just before the rollers 32 and 33 force the protuberance 23 into the passage 17 through the slot 18. The strip 10 being flexible the walls of slot 18 will spread apart to permit the protuberance 23, with the wire 26 inside channel 22 to enter the passage 17 and thus interlock the edge sections 12 and 13 together. If a cement or adhesive is applied to the parts as previously mentioned, the rollers 32 and 33 will press the parts firmly together and adhere them together to assure a firmly interlocked joint between the edge sections 12 and 13 and the wire 26.

From the foregoing it can be seen that the present invention provides a very flexible hose formed of a single strip of an extruded elastomeric thermo-plastic material and a reinforcing wire spirally wound together at the mating edges of the strip with the wire serving to interlock the edges of the strip together and also serving as a reenforcement to prevent the collapse of the hose.

While I have shown and described but a single embodiment of my invention it is to be understood that that embodiment is to be taken as illustrative only and not in a limiting sense. I do not wish to be limited to the particular structure shown and described but wish to include all equivalent variations thereof except as limited by the scope of the claims.

I claim:

1. A flexible hose comprising, a spirally wound strip of an elastomeric thermo-plastic material, said strip including interlocking edge sections connected by a relatively thin outwardly bulged section, one of said edge sections being formed with a reentrant groove, the other of said edge sections being formed with a protuberance interlocked with said reentrant groove, said protuberance being formed with an interior channel and a spirally wound reinforcing wire positioned within said channel and serving to lock said protuberance within said reentrant groove.

2. A flexible hose according to claim 1 in which said protuberance is bonded to the walls of said reentrant groove.

3. A flexible hose according to claim 1 in which said reinforcing wire is bonded within the channel of said protuberance.

4. A flexible hose according to claim 1 in which said reentrant groove is formed with a relatively narrow neck portion and a wider interior portion and said protuberance is formed to mate with the neck and interior portions of said reentrant groove.

5. A flexible hose comprising, a spirally wound elastomeric thermo-plastic strip including interlocked edge sections connected by a relatively thin outwardly bulged section, one of said edge sections being formed with a reentrant groove and with lands on either side of said reentrant groove, the other of said edge sections being formed with a protuberance interlocked with said reentrant groove and with lands mating with the lands of said first edge section, said protuberance being formed with an interior channel and with a slit extending from said channel to the surface of said other section and a spirally wound reenforcing wire positioned within said channel and serving to lock said protuberance within said reentrant groove.

6. A flexible hose according to claim 5 in which said protuberance is bonded within said reentrant groove.

7. A flexible hose according to claim 6 in which said reentrant groove is formed with a relatively narrow neck portion and a wider interior portion and said protuberance is formed to mate with the neck and interior portions of said reentrant groove.

8. An extruded strip of an elastomeric thermo-plastic material adapted for use in forming a flexible hose comprising, a relatively thin outwardly bulged central section connecting first and second edge sections adapted to be interlocked with each other, said first edge section being formed with a reentrant groove and said second edge section being formed with a protuberance adapted to interlock with the reentrant groove of said first section, the reentrant groove of said first edge section having a relatively narrow neck portion and a wider portion and the protuberance of said second edge section being formed to mate with the reentrant groove of said first edge section.

9. An extruded strip according to claim 8 in which the protuberance of said second section is formed with an interior channel adapted to receive a reenforcing wire.

10. An extruded strip according to claim 8 in which said first edge section extends laterally from one side of said outwardly bulged section and in which is formed said upwardly opening reentrant groove, a pair of upwardly facing lands on either side of said reentrant groove and in which said second edge section extends laterally from the other side of said bulged central section and which is formed with said downwardly extending protuberance adapted to mate with the reentrant groove of said first edge section, said second edge section also being formed with downwardly facing lands on either side of said protuberance adapted to mate with the upwardly facing lands of said first edge section.

11. An extruded strip according to claim 10 in which a channel is formed in the protuberance of said second edge section adapted to receive a reenforcing wire for locking said edge sections to each other.

12. An extruded strip according to claim 11 in which a slit is formed in said second edge section leading into said channel whereby the reenforcing wire may be inserted into said channel.

References Cited in the file of this patent

UNITED STATES PATENTS

| Number | Name | Date |
|---|---|---|
| 1,068,553 | Abell et al. | July 29, 1913 |
| 2,486,387 | Bringolf | Nov. 1, 1949 |
| 2,516,864 | Gilmore et al. | Aug. 1, 1950 |
| 2,640,500 | Hamblin | June 2, 1953 |